United States Patent Office 3,446,779
Patented May 27, 1969

3,446,779
PRODUCT OF CATALYZING POLYURETHANE FORMATION BY MEANS OF 2-MERCAPTO-BENZOTHIAZOLES, THIAZOLES, OXAZOLES, IMIDAZOLES AND IMIDAZOLINES
Anthony F. Finelli, Akron, and Charles A. Suter, Cuyahoga Falls, Ohio, assignors to The Goodyear Tire & Rubber Company, Akron, Ohio, a corporation of Ohio
No Drawing. Filed Sept. 1, 1964, Ser. No. 393,779
Int. Cl. C08g 22/10
U.S. Cl. 260—75         2 Claims

ABSTRACT OF THE DISCLOSURE

This invention relates to a method of preparing polyurethanes which have improved fungicidal and bactericidal properties by the use of a catalytic amount of a 2-mercapto compound of benzothiazole, thiazole, thiazoline, oxazole, imidazole and imidazoline during the curing with a crosslinking agent selected from the class of organic diamines, glycols and alcoholamines.

---

This invention relates to methods for accelerating reactions of organic compounds having reactive groups of the formula —NCY, in which Y is oxygen or sulfur, with compounds having groups containing reactive hydrogen as determined by the Zerewitinoff method described in J. Am. Chem. Soc., vol. 49, page 3181 (1927). These methods are generally useful in promoting reactions of isocyanates and isothiocyanates with a wide variety of active hydrogen-containing compounds and have found particular and immediate applicability in the preparation of polyurethanes, a broad class of organic polymers formed by reactions of di- or polyisocyanates or di- or polyisothiocyanates with a large variety of difunctional or polyfunctional compounds having hydroxyl or amino groups (containing active hydrogen), e.g., water, polyols, polyamines, polyethers, polyesters, polyoxy-carboxy alkylenes, and the like.

An object of this invention is to provide new accelerating materials for the isocyanate reaction and polyurethanes having improved physical properties.

These objects and other advantages may be accomplished by reacting a reactive hydrogen containing substance of about 400 to about 10,000 molecular weight with excess of an organic isocyanate in the presence of a catalytic amount of accelerator of the type hereinafter defined. More specifically, the reaction occurs in the presence of a catalytic amount of the hereinafter described accelerator in a mixture containing an excess of organic polyisocyanate relative to the reactive hydrogen containing substance of 400 to 10,000 molecular weight and a monomeric reactive hydrogen containing material, frequently referred to herein as crosslinkers. Where elastomers are desired hydrogen containing substances of about 1000 to 3500 molecular weight are used.

The terms "isocyanate" and "isothiocyanates" are used herein to refer to mono- and polyisocyanates and to mono- and polyisothiocyanates, respectively, including particularly diisocyanates and diisothiocyanates. While the invention has been described specifically with reference to the reaction of certain monoisocyanates. diisocyanates and monoisothiocyanates, it is generally applicable to the reaction of any compound containing one or more —N=C=Y groups i which Y is oxygen or sulfur. Compounds within the generic definition include monoisocyanates and monoisothiocyanates of the general formula

RNCY in which R is a hydrocarbon or substituted hydrocarbon radical such as alkyl, cycloalkyl, alkenyl, alkynyl, aralkyl, aryl, alkaryl, or a substituted analogue thereof. Examples of such compounds include methyl isocyanate, ethyl isocyanate, butyl isocyanate, octyl isocyanate, octadecyl isocyanate, vinyl isocyanate, isopropenyl isocyanate, ethynyl isocyanate, benzyl isocyanate, phenyl isocyanate, vinylphenyl isocyanate, tolyl isocyanate, ethyl isothiocyanate and phenyl isothiocyanate. Also included are polyisocyanates and polyisothiocyanates of the formula $R(NCY)_x$ in which $x$ is two or more and R can be alkylene, substituted alkylene, arylene, substituted arylene, a hydrocarbon or substituted hydrocarbon containing one or more aryl—NCY bonds and one or more lkyl—NCY bonds, a hydrocarbon or substituted hydrocarbon containing a plurality of either aryl—NCY or alkyl—NCY bonds. R can also include radicals such as —R—Z—R— where Z may be any divalent moiety such as —O—,

—O—R—O—

—CO—, —CO$_2$—, —S—, —S—R—S—, —SO$_2$—, etc.

Examples of such compounds include hexamethylene diisocyanate, 1,8- diisocyanato-p-methane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene - alpha, alpha', -diisothiocyanate, and isopropylbenzene-alpha, 4-diisocyanate.

Further included are dimers and trimers of isocyanates and diisocyanates and polymeric diisocyanates of the general formulae $(RNCY)$ and $[R(NCY)_x]_y$ in which $x$ and $y$ are two or more, as well as compounds of the general formula $M(NCY)_x$ in which $x$ is one or more and M is a monofunctional or polyfunctional atom or group. Examples of this type include ethylphosphonic diisocyanates, $C_2H_5P(O)(NCO)_2$; phenylphosphonous diisocyanate, $C_5H_5P(NCO)_2$; compounds containing a ≡Si—NCY group, isocyanates derives from sulfonamides (RSO$_2$NCO), cyanic acid, thiocyanic acid, and compounds containing a metal—NCY group such as tributyltin isocyanate.

It is also to be understood that the active hydrogen-containing compounds that are capable of reacting with isocyanates in accordance with the method of the invention are by no means limited to compounds containing hydroxyl and amino groups but generically include all compounds which give a positive test for reactive hydrogen as determined by the Zerewitinoff method. Typical of the active hydrogen-containing compounds whose reaction with isocyanates and isothiocyanates may be accelerated and in some instances even made possible are compounds containing an oxygen-hydrogen bond, such as water, hydrogen peroxide, alcohols, hydroperoxides, phenols, boronic acids, carboxylic acids, percarboxylic acids and sulfonic acids; compounds containing a nitrogen-hydrogen bonds, such as ammonia, amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds, and sulfonamides; compounds containing a sulfur-hydrogen bond, such as mercaptans, thiophenols and thioacids; halogen acids; compounds containing active methylene groups and compounds capable of forming enols such as acetone, malonic esters, acetoacetic esters, acetylacetone and nitromethane; and miscellaneous active hydrogen-containing compounds, such as acetylenic compounds and dialkyl phosphonates. Also included among the applicable active hydrogen-containing compounds are compounds containing two or more of any one or combination of active hydrogen groups already described. Examples include ethylene glycol, diethylene glycol, hexamethylene glycol, glycerol, 1,2,6-hexanetriol, sorbitol, dextrin, starch, cellulose, polyvinyl alcohol, copolymers, cellulose acetate, shellac, castor oil, polyesters, alkyd resins, polyvinyl acetals, polyvinyl ketals, polyethers, polyetheresters, polyacrylic acids, ethylene diamine, hexamethylene diamine, ethanolamines, polyesteramides, poly(hexamethylene adipamide), wool, and proteins. Materials such as glass and metal which have thin films of moisture on their surfaces at the time of reaction with an isocyanate or isothiocyanate are also included.

The method of the invention is particularly suitable for reaction of organic polyisocyanates with high molecular weight polymers having at least two end groups containing reactive hydrogen. A preferred class of such polymers includes polyoxyalkylene polyols. These are long chain polyols containing one or more chains of connected oxyalkylene groups. Most desirably, these polyoxyalkylene polyols are liquids having an average molecular weight in the range of 500 to 5000.

Examples of these polyoxyalkylene polyols include polypropylene glycols having average molecular weights of 500 to 5000, and reaction products of propylene oxide with linear diols and higher polyols, said higher polyols when employed as reactants giving rise to branched polyoxyalkylene polyols; and ethylene oxide-propylene oxide copolymers having average molecular weights of 500 to 5000 and in which the weight ratio of ethylene oxide to propylene oxide ranges between 10:90 and 90:10, including reaction products of mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol, as well as the carboxylic acids such as the phthalic acid and aliphatic polycarboxylic acids.

Another class of polyoxyalkylene polyols are the so-called block copolymers having a continuous chain of one type of oxyalkylene linkage connected to blocks of another type of oxyalkylene linkage. Examples of such block copolymers are reaction products of polypropylene glycols having average molecular weights of 500 to 5000 with an amount of ethylene oxide equal to 5 to 25% by weight of the starting polypropylene glycol. Another class of such block copolymers is represented by the corresponding reaction products of propylene oxide with polyethylene glycols.

Further examples of the class of polyoxyalkylene polyols include polyethylene glycols, polybutylene glycols and copolymers, such as polyoxyethyleneoxybutylene glycols and polyoxypropyleneoxybutylene glycols. Included in the term "polybutylene glycols" are polymers of 1,2-butylene oxide, 2,3-butylene oxide and 1,4-butylene oxide.

Among the polyesters which are suitable reactants for isocyanates are those having reactive hydrogen-containing terminal groups, preferably predominantly hydroxyl groups. Polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid.

Another preferred class of polymers having terminal groups that contain reactive hydrogen atoms and are suitable for reaction with polyisocyanates are the lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chain, and block copolymers thereof. The lactones that are particularly suitable in polymers and copolymers of this type are the epsilon-caprolactones, preferably the unsubstituted caprolactones and caprolactones having up to about three alkyl substituents on the ring. The lactone residues in heteric and block copolymers may be linked by oxyalkylene chains derived from ethylene oxide, propylene oxide, butylene oxide or the like, and by polyoxyalkylene chains, e.g., polyoxypropylene, polyoxyethylene, polyoxybutylene chains or mixtures or copolymers thereof.

The glycols also are intended to include the hydrocarbon diols such as the hydroxyl terminated polybutadienes, polyisoprenes, polydiene-styrene, etc.

It is also to be understood that a compound containing reactive NCY groups and reactive hydrogen, such as a prepolymeric reaction product of any of the foregoing polymers with an isocyanate, can be reacted with itself or with a compound containing reactive hydrogen, such as water, a polyol or an amino-alcohol.

Where the prepolymeric reaction product contains free NCO groups, its reaction with aromatic primary diamines gives interesting products especially desirable for spray coatings, castings and coller applied coatings for cement surfaces and others. Use of diamine such as the fast diamines, for example, methylene dianiline, o-dianisidine, and the slow diamines, for example, methylene (bis-orthochloroaniline), orthodichlorobenzidene, with polyester and polyester polyol-modified isocyanates gives a reaction mixture well suited for spray applications such as making fuel cells and pillow tanks.

Usually a molar excess of the isocyanate is used based on the reactive hydrogen containing substance. Thus the amount of isocyanate may vary from about 1 to 2.5 mols per mol of polyester or polyether and preferably about 1.5 to 2.0 mols, although higher than 2.5 may be used. The amount of crosslinker, viz. diamine, glycol, etc. normally be about 0.1 to 0.95 mols for each mol of free isocyano groups although this invention permits slightly higher levels to be used.

The accelerator of this invention in a 2-mercapto compound designated by $$H-S-A$$

wherein A is selected from the benzothiazole, thiazole, thiazoline, oxazole, imidazole or imidazoline radical. Materials of the above formula are referred to hereinafter as azole mercaptans. Representative azole mercaptans are:

2-mercapto-4-methylthiazole
2-mercapto-4-methyloxazole
2-mercapto-4-methylimidazole
2-mercapto-4-ethylthiazole
2-mercapto-4-methyloxazole
2-mercapto-4-methylimidazole
2-mercapto-4-n-propylthiazole
2-mercapto-4-n-propyloxazole
2-mercapto-4-n-propylimidazole
2-mercapto-4-n-butylthiazole
2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole 2-mercapto-4,5-di-n-propyloxazole
2-mercapto-4,5-di-n-propylimidazole
2-mercapto-4,5-di-n-butylthiazole
2-mercapto-4,5-di-n-butyloxazole
2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole
2-mercapto-benzooxazole A preferred class of activators is the mercapto-thiazoles and related compounds convertible thereinto, including 2-mercaptobenzothiazole, homologs thereof, and ring substitution products thereof, including the substituents of aryl, alkyl, and cycloalkyl radicals. Other activators include 2-mercapto-4,5,6,7-tetrahydrobenzothiazole and corresponding derivatives thereof: 2-mercaptothiazole and corresponding derivatives thereof; 2-mercaptothiazoline and corresponding derivatives; 2-mercaptoimidazole and corresponding derivatives; 2-mercaptobenzimidazole and corresponding derivatives; 2-mercaptooxazole and corresponding derivatives; and 2-mercaptoimidazoline and corresponding derivatives. In addition, certain aldehyde reaction products of the azole mercaptan accelerators are known to decompose to the mercaptan and free aldehyde at conventional rubber curing temperatures, e.g., the formaldehyde reaction product of 2-mercaptobenzothiazole, and these accelerators are especially useful.

The term "fast amines" and "slow amines" used herein is used to distinguish those diamines which develop a turbidity inside of about 10 to less than about 25 seconds with the boiling methylene chloride test. The boiling methylene chloride test is usually run using about .2 to .5 molar solution of the diisocyanate and the diamine dissolved in methylene chloride. The resulting solutions of diamine and polyisocyanate are mixed at the boiling point of methylene chloride and those that develop a turbidity after about 30 seconds are considered to be slow diamines.

The following representative examples illustrate various embodiments of this invention, the parts referred to are by weight unless otherwise indicated:

PREPARATION OF DILUTED PREPOLYMER A

Example I

A prepolymer was prepared by reacting one mole of a mixed adipate, obtained by condensing adipic acid with a mixture of 80% ethylene glycol and 20% propylene glycol to give an ester having a reactive number of 60, with two moles of toluene diisocyanate comprised of 80% of the 2,4 isomer and 20% of the 2,6 isomer. This prepolymer (2000 parts) was dissolved in a mixture of 600 parts of methyl ethyl ketone, 600 parts of Cellosolve acetate and 100 parts of a 20% solution of cellulose acetate butyrate in Cellosolve acetate to give a diluted prepolymer.

PREPARATION OF DILUTED PREPOLYMER B

Example II

A prepolymer was prepared by reacting a mixture consisting of two mols of a mixed adipate, obtained by condensing a mixture of 80% ethylene glycol and 20% propylene glycol with adipic acid to give an ester having an ester having a reactive number of 60, and one mol of tetramethylene adipate having a reactive number of 60 and 6 mols of tolylene diisocyanate, a mixture containing 80% of the 2,4 isomer and 20% of the 2,6 isomer. This prepolymer (200 parts) was dissolved in a mixture of 600 parts of methyl ethyl ketone, 600 parts toluene, 100 parts of a 10% solution of cellulose acetate butyrate in Cellosolve acetate to give diluted prepolymer B.

PREPARATION OF DILUTED PREPOLYMER C

Example III

The procedure of Example I was used to prepare diluted prepolymer C except 600 parts of toluene was substituted for the 600 parts Cellosolve acetate.

Example IV

The diluted prepolymer A (160 parts) of Example I and 1.0 part of 2-mercaptobenzothiazole was charged to a ball mill and rolled overnight. Then 100 parts of the ball mill solution was mixed with 12 parts of a curative solution containing 6 parts of methyl ethyl ketone and 6 parts of 4,4'-methylene bis-(2-chloroaniline), hereinafter called MOCA to give a reaction mixture. This reaction mixture was used to form films by both the spread and spray techniques. Control films were made similarly except they did not contain 2-mercaptobenzothiazole.

These films were subjected to the soil burial test by burying in rotted moist manure at about 75° F. In 21 days the control films showed signs of deterioration while films made from the reaction mixtures containing 2-mercaptobenzothiazole showed no signs of deterioration after 105 days.

Example V

In this example the mercapto catalyst was added to the curative mixture containing 3 parts MOCA and 6 parts of methyl ethyl ketone. The amount of the mercapto catalyst in the curative mixture is shown in Table 1. The diluter perpolymer A of Example I (50 parts) was mixed with the curative mixture and then poured on a polyethylene slab where it was doctor drawn to give a sheet of 0.006+0.004 inches thick.

Example II shows the gel and the tack-free time, and cured physicals obtained on the sheets made above using the various mercapto catalysts listed in the amounts indicated. Gel time is the time in minutes the mixture of the diluted prepolymer and curative mixture remained pourable and tack-free time is the time in minutes required for the films to feel dry to the touch of the fingers.

TABLE 1

| Mercapto catalyst | Amount, parts | Gel time, min. | Tack free, min. | Cured physicals [1] Tensile/ elongation, p.s.i./percent |
|---|---|---|---|---|
| Control | None | 110 | 205 | 4,800/670 |
| 2-mercaptobenzo-thiazole. | 0.5 | 54 | 70 | 9,400/590 |
|  | 1.0 | 27 | 40 |  |
|  | 1.5 | 17 | 37 | 8,500/690 |
|  | 2.0 | 15 | 58 | 7,600/660 |
| 2-mercapto-5-chloro-benzothiazole. | 0.5 | 38 | 88 | 6,700/610 |
|  | 1.0 | 26 | 60 |  |
| 2-mercapto-4-phenyl-thiazole. | 0.5 | 40 | 89 | 7,100/650 |
|  | 1.0 | 28 | 56 |  |
|  | 1.5 | 19 | 57 | 8,000/670 |
|  | 2.0 | 16 | 53 | 7,900/680 |
| 2-mercapto-4-methyl-5-phenylthiazole. | [2] 0.5 | 26 | 40 |  |
|  | [2] 1.0 | 25 | 35 | 7,500/620 |
| 2-mercaptothiazoline | 0.5 | 34 | 85 | 7,600/620 |
|  | 1.0 | 20 | 63 |  |
|  | 1.5 | 25 | 52 | 7,400/650 |
|  | 2.0 | 10 | 32 | 6,800/600 |
|  | 3.0 | 7 | 24 |  |

[1] After standing at about 75° F. for 14 days.
[2] 10-15 extra parts of methyl ethyl ketone was required to dissolve the ingredients of the curative mixture.

Example VI

The procedure of Example V was used to make sheets of film. Table 2 compares the gel time and tack-free time of the reaction mixtures obtained with and without the mercapto catalysts listed.

TABLE 2

| Mercapto catalyst [1] | Gel time, minutes | Tack free, minutes |
|---|---|---|
| Control (none) | 110 | 205 |
| 2-mercaptobenzothiazole | 27 | 40 |
| Dimercaptothiodiazole | 22 | 35 |
| 2-mercapto-4,5-dimethyl thiazole [2] | 12 | 27 |
| 2-mercapto-6-nitro benzothiazole | 19 | 40 |
| 2-mercapto-4-methyl-5-acetyl thiazole [2] | 28 | 50 |
| 2-mercaptobenzimidazole [2] | 37 | 88 |
| 2-mercapto-4-isobutyl thiazole | 14 | 30 |
| 2-mercapto-4,5-dimethyl thiazole [2] | 16 | 29 |
| 2-mercapto-4-isobutyl thiazole [2] | 23 | 35 |

[1] The amount of catalyst used was 1 part except for the bottom two catalysts which were used in the amount of 0.5 part.
[2] From 4 to 14 parts of extra methyl ethyl ketone was used to dissolve the ingredients of the curative mix.

Example VII

The dilute prepolymers B and C respectively from Examples II and III were used in this example to produce films. The prepolymers (40 parts) were mixed with the curative mix which contained 2 parts ortho-dichlorobenzidine, 5 parts methyl ethyl ketone and the amount of 2-mercaptobenzothiazole indicated in Table 3 to form a reaction mixture. The reaction mixtures were cast on a polyethylene slab and drawn with a doctor knife to give cured films having the thickness shown in Table 3.

TABLE 3

|  | 1 | 2 | 3 | 4 |
|---|---|---|---|---|
| Dil. prepolymer C | 40 | 40 |  |  |
| Dil. prepolymer B |  |  | 40 | 40 |
| 2-mercaptobenzothiazole |  | 0.4 |  | 0.4 |
| Gel time, minutes | 150 | 45 | 110 | 40 |
| Cure conditions: |  |  |  |  |
| Temperature, °F | 75 | 75 | 168 | 168 |
| Time | 14 days | 14 days | 8 hrs. | 8 hrs. |
| Tensile, (p.s.i.) | 4,200 | 6,200 | 3,600 | 5,700 |
| Elongation (percent) | 670 | 660 | 520 | 520 |
| Modulus, percent: |  |  |  |  |
| 100 | 700 | 900 | 700 | 900 |
| 300 | 1,100 | 1,600 | 1,300 | 1,600 |
| 500 | 2,700 | 3,900 | 3,200 | 5,000 |
| Film thickness (inch) | .014 | .013 | .015 | 0.010 |

PREPARATION OF CUT THREAD

Example VIII

A prepolymer D was prepared by reacting one mol of a mixed ethylene-propylene adipate with 2 mols of diphenylmethane-4,4'-diisocyanate. Then 50 parts of prepolymer D was mixed with a curative containing 4.5 parts of MOCA dissolved in 4 parts of the polyester and the amount of mercapto catalyst shown in Table 4 was cast on a polyethylene slab and was drawn with a doctor knife to form a film when cured. The films were given a post cure at 168° F. for 8 hours and then threads 5/64 of an inch were cut from the films. The physical properties of the threads cut from the film is shown in Table 4:

TABLE 4

| Mercaptan catalyst | Sample No. |  |  |  |
|---|---|---|---|---|
|  | 1 | 2 | 3 | 4 |
| Amount used: |  |  |  |  |
| Control | None |  |  |  |
| 2-mercaptobenzothiazole |  | 1 | 0.5 |  |
| 2-mercapto-4-methyl-5-phenyl thiazole |  |  |  | 0.5 |
| Strip time at 168° F., minutes | 50 | 16 | 21 | 40 |
| Physicals cut thread: |  |  |  |  |
| Tensile (p.s.i.) | 5,500 | 7,200 | 9,500 | 7,900 |
| Elongation (percent) | 620 | 630 | 780 | 720 |
| Film thickness (inch) | 0.015 | 0.010 | 0.010 | 0.10 |

Example IX

The diluted prepolymer A (50 parts) from Example I was mixed with solution of 2.5 of 4,4'-diamino diphenyl methane, 0.5 parts 2-mercaptobenzothiazole and 7 parts of methyl ethyl ketone and then was cast onto a polyethylene slab to be drawn down to a thickness sufficient to yield a film 0.008 inches thick when cured. The film was strippable in 20 minutes at room temperature. The cured film had a 580% elongation and a tensile of 5600 pounds per square inch.

Example X

A diluted prepolymer was prepared by dissolving a 100 parts of Adiprene L-100 prepolymer, the reaction product of about 2 mols of commercial toluene diisocyanate with one mol of a polytetramethylene ether glycol in a mixture of 30 parts methyl ethyl ketone, 30 parts cellosolve acetate and 1 part Modaflow, a commercial coal tar base leveling agent. This diluted prepolymer was then reacted with a curative comprising 10 parts of MOCA, 10 parts of methyl ethyl ketone and the amount of oily 2-mercaptobenzothiazole indicated in Table 5:

TABLE 5

| 2-mercaptobenzothiazole, parts | Time, minutes | |
|---|---|---|
|  | Gel | Tack free |
| 0 | 367 | 397 |
| 2 | 180 | 190 |
| 4 | 120 | 155 |
| 8 | 78 | 129 |

Example XI

A prepolymer was prepared by reacting a mixture of one mol of polypropylene ether glycol of 1000 molecular weight and one mol of polypropylene ether glyocl of 2000 molecular weight with four mols of commercial toluene diisocyanate. This prepolymer (100 parts) was dissolved in a mixture of 30 parts of methyl ethyl ketone, 30 parts Cellosolve acetate and 1 part Modaflow. This diluted prepolymer was reacted with a curative comprising 12 parts MOCA, 12 parts methyl ethyl ketone and the amount of oily-2-mercaptobenzothiazole shown in Table 6:

TABLE 6

| 2-mercaptobenzothiazole, parts | Time, minutes | |
|---|---|---|
|  | Gel | Tack free |
| 0 | 220 | 300 |
| 2 | 82 | 122 |
| 4 | 64 | 106 |
| 8 | 40 | 75 |

Example XII

The diluted prepolymer (100 parts) of Example X was reacted with a curative having the MOCA and oily 2-mercaptobenzothiazole dissolved in methyl ethyl ketone. The curative levels are shown in Table 7 where the amount of MOCA is expressed as mols per mol of free isocyanato groups in the prepolymer:

TABLE 7

| Level | | Tensile | Elongation |
|---|---|---|---|
| MOCA | 2-mercaptobenzothiazole, parts | | |
| 0.7 | 0.5 | 2,450 | 570 |
| 0.8 | 0.5 | 2,540 | 510 |
| 0.9 | 0.5 | 2,400 | 490 |
| 1.0 | 0.5 | 2,400 | 490 |
| 1.1 | 0.5 | 2,100 |  |
| 0.9 | 1.0 | 1,900 | 540 |
| 1.1 | 1.0 | 1,600 | 450 |
| 0.5 | 0 | 1,600 | 435 |
| 0.5 | 0 | 1,600 | 480 |
| 0.7 | 0 | 1,500 | 540 |
| 0.9 | 0 | 1,500 | 540 |
| 1.1 | 0 | 460 | 190 |
| 1.3 | 0 | 360 | 50 |

The diluted prepolymer and curative was formed into a sheet and the sheet was allowed to stand for several days at room temperature before stamping out the test specimens and running tensile and modulus on the resulting test specimens.

This example illustrates another advantage obtainable with the 2-mercapto catalyst of this invention; namely, it permits a slight excess of the diamine over the equivalent free isocyanate to be used without deterioration of the physical properties of the cured samples. Thus, it is possible to use as little as about 0.2 mol to about 1.1 mols of a diamine based on the mols of free isocyanate groups in the prepolymer where heretofore an excess of 1 mol has materially affected the physical properties.

Thus, these examples illustrate the beneficial effect achieved by the use of a catalytic amount of the H-S-A accelerator. Normally, about 0.1 to 10 parts of the H-S-A accelerator per 100 parts of reactive hydrogen substance is used with the preferred amount being at least about 0.2 part and the more preferred range being about 0.5 to 8 parts.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane which shows no sign of deterioration on standing at 75° F. for at least 50 days in moist rotted manure comprising the reaction product of a mol of a polyester of the structure obtained by condensation of an aliphatic polyol containing 2 to 10 carbon atoms with a polycarboxylic acid having from 2 to 36 carbon atoms and of about 400 to 10,000 molecular weight with about 1.5 to 2.5 mols of an organic diisocyanate and at least about 0.3 to 1.1 mols of a crosslinker selected from the class consisting of glycols and organic diamines and about 0.5 to 10 parts of a 2-mercapto benzothiazole per hundred parts of the polyester.

2. The polyurethane of claim 1 wherein the 2-mercaptobenzothiazole is added to the reaction product of the organic polyisocyanate and polyester immediately prior to addition of the glycol or organic diamine.

References Cited

UNITED STATES PATENTS

| | | | |
|---|---|---|---|
| 2,764,592 | 9/1956 | Seeger, et al. | 260—77.5 |
| 2,917,489 | 12/1959 | Gladding et al. | 260—77.5 |
| 2,944,998 | 7/1960 | Buxboum | 260—75 |
| 3,177,223 | 4/1965 | Erner | 260—77.5 |
| 3,235,518 | 2/1966 | Hostettler et al. | 260—77.5 |

FOREIGN PATENTS

| | | |
|---|---|---|
| 701,712 | 12/1953 | Great Britain. |
| 767,017 | 1/1957 | Great Britain. |
| 773,991 | 5/1957 | Great Britain. |

OTHER REFERENCES

Dictionary of Organic Compounds: Oxford, New York (1965), vol. 1, page 310; vol. 5, page 2585.

Ministry of Agriculture & Fisheries (Great Britain: Manures and Fertilizers, Chemical Publishing, New York (1952) pages 10–12, 14, 24, 25. Call No. QO-S-641-G-7.

DONALD E. CZAJA, Primary Examiner.

H. S. COCKERAM, Assistant Examiner.

U.S. Cl. X.R.

260—45.8, 77.5

PO-1050
(5/69)

UNITED STATES PATENT OFFICE
CERTIFICATE OF CORRECTION

Patent No. 3,446,779                    Dated   May 27, 1969

Inventor(s)   Anthony F. Finelli and Charles A. Suter

It is certified that error appears in the above-identified patent and that said Letters Patent are hereby corrected as shown below:

In the specification, column 1, line 30, "generally" should read -- generically --; line 66, "i" should read -- in --; Column 2, line 23, "methane" should read -- menthane --; line 28, "xylene" should read -- xylylene --; line 35, in the formula, "(RNCY)" should read -- $(RNCY)_x$ --; line 43, "$C_5H_5P$" should read -- $C_6H_5P$ --;
Column 3, line 3, "copolymers" should read -- ethylene-vinyl alcohol copolymers --;
Column 4, line 31, "coller" should read -- roller --; line 36, "polyester" should read -- polyether --; line 45, before "be" insert -- will --; line 48, "in" should read -- is --;
Column 5, line 62, "20%" should read -- 10% --; line 72, "and" should read -- with--; line 75, "(200 parts)" should read -- (2000 parts) --;
Column 6, line 38 "+" should read -- $\pm$ --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents